Figure 1:
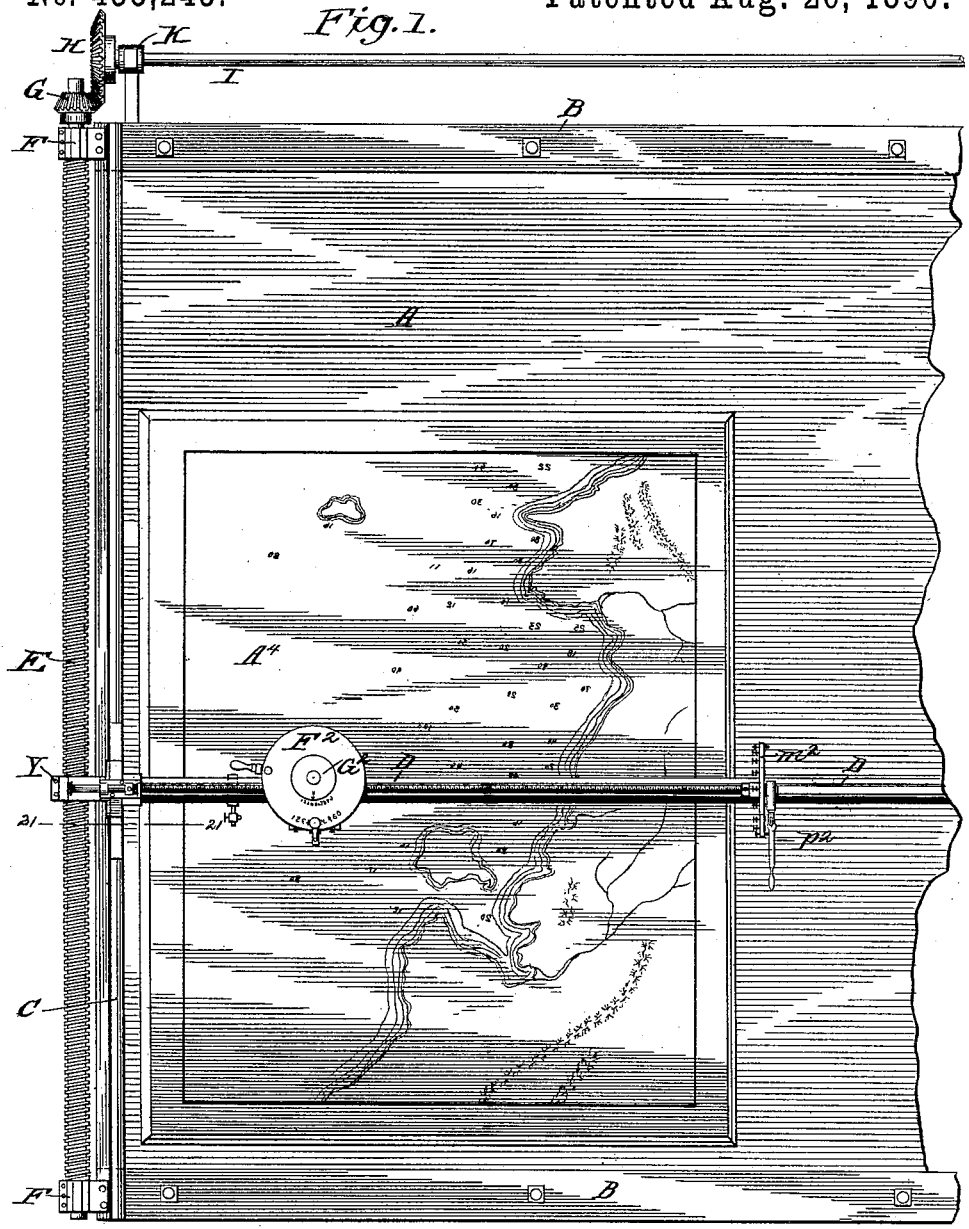

(No Model.) 9 Sheets—Sheet 1.

V. L. OURDAN & C. A. KOLB.
ENGRAVING APPARATUS.

No. 435,243. Patented Aug. 26, 1890.

WITNESSES:
Marcus J. Hopkins.
C. P. Elwell

INVENTORS.
Vincent L. Ourdan
Charles A. Kolb
BY
Hopkins & Atkins.
ATTORNEYS (No Model.) 9 Sheets—Sheet 2.

V. L. OURDAN & C. A. KOLB.
ENGRAVING APPARATUS.

No. 435,243. Patented Aug. 26, 1890.

WITNESSES:
Marcus S. Hopkins.
C. P. Elwell.

INVENTOR:
Vincent L. Ourdan
Charles A. Kolb
BY
Hopkins & Atkins.
ATTORNEYS (No Model.) 9 Sheets—Sheet 3.

V. L. OURDAN & C. A. KOLB.
ENGRAVING APPARATUS.

No. 435,243. Patented Aug. 26, 1890.

WITNESSES:
Marcus S. Hopkins.
C. P. Elwell.

INVENTORS.
Vincent L. Ourdan
Charles A. Kolb.
BY
Hopkins & Atkins
ATTORNEYS.

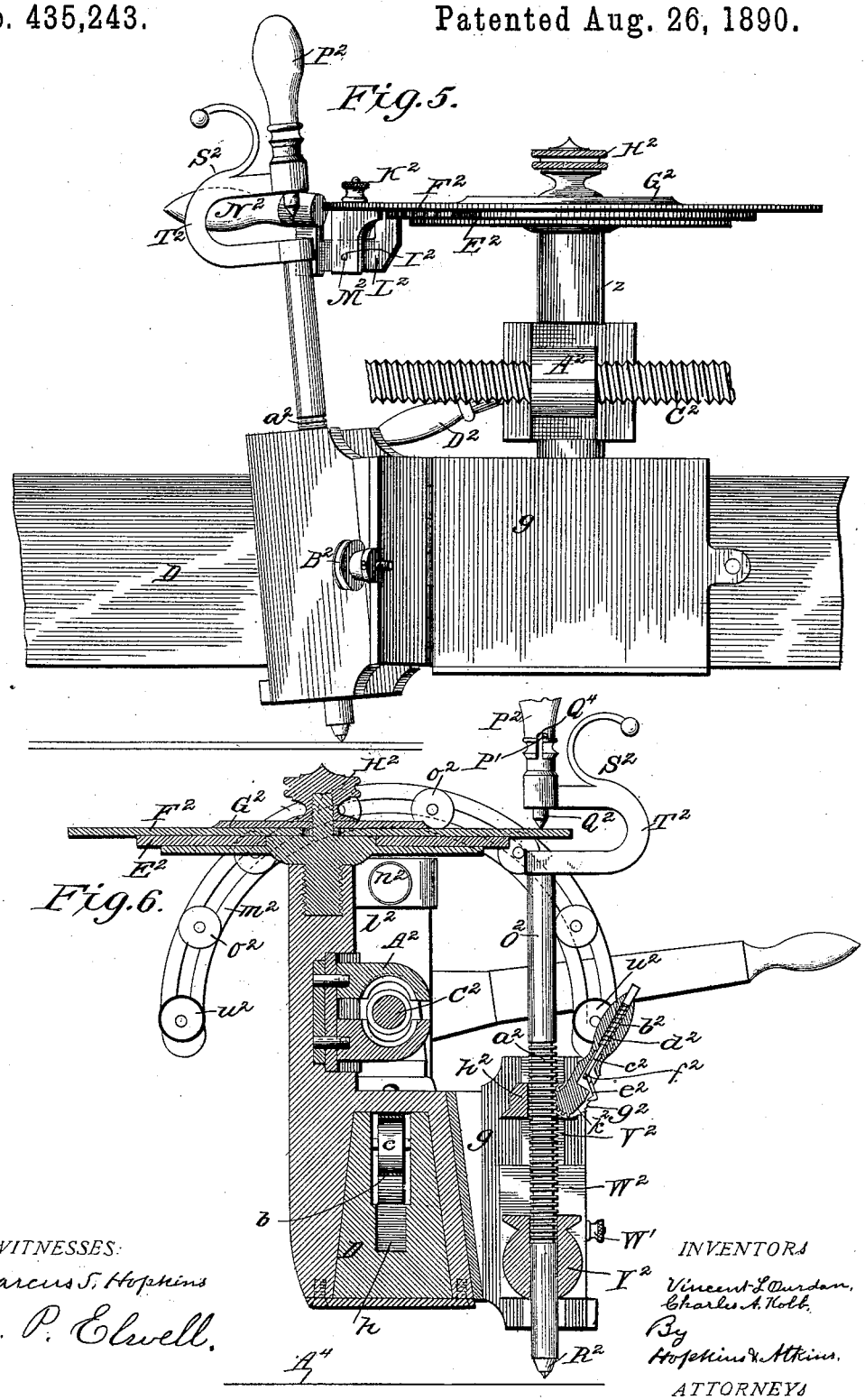

(No Model.) 9 Sheets—Sheet 5.
V. L. OURDAN & C. A. KOLB.
ENGRAVING APPARATUS.
No. 435,243. Patented Aug. 26, 1890.
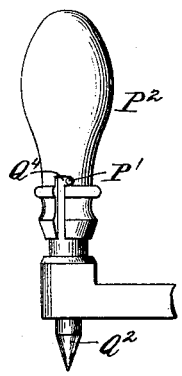
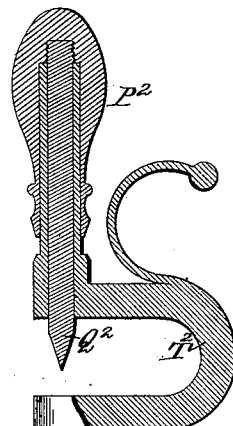
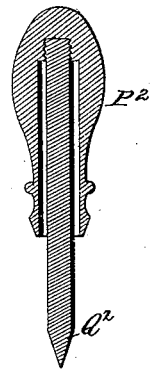
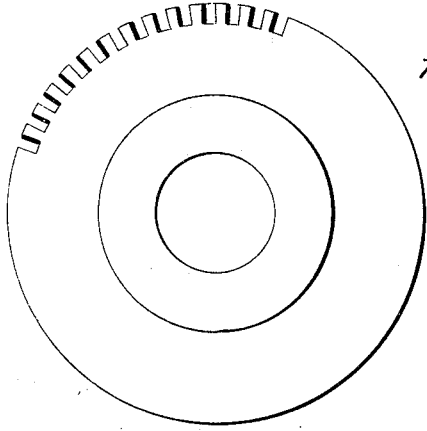
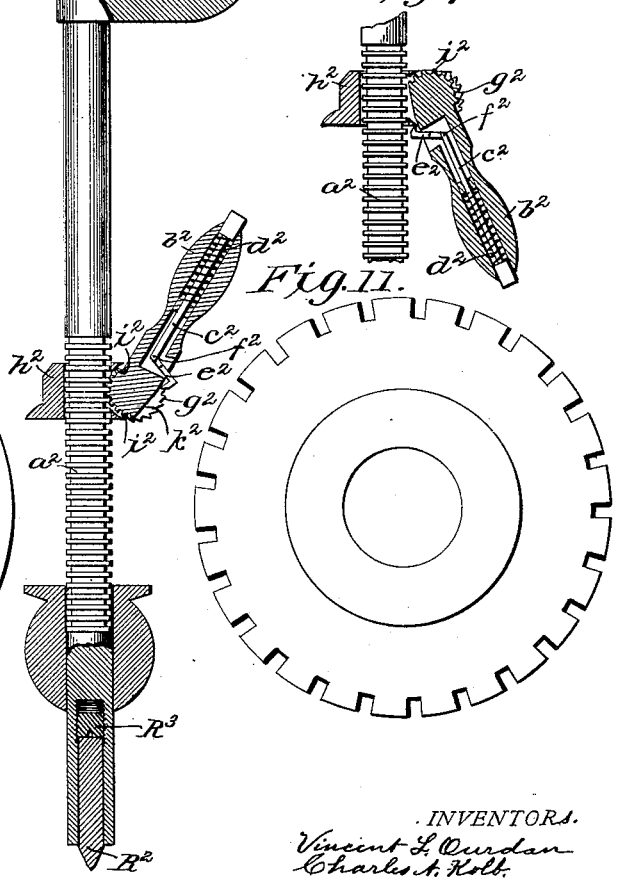
WITNESSES:
Marcus T. Hopkins
C. P. Elwell
INVENTORS.
Vincent L. Ourdan
Charles A. Kolb
BY
Hopkins & Atkins
ATTORNEYS.

(No Model.) 9 Sheets—Sheet 6.
V. L. OURDAN & C. A. KOLB.
ENGRAVING APPARATUS.
No. 435,243. Patented Aug. 26, 1890.
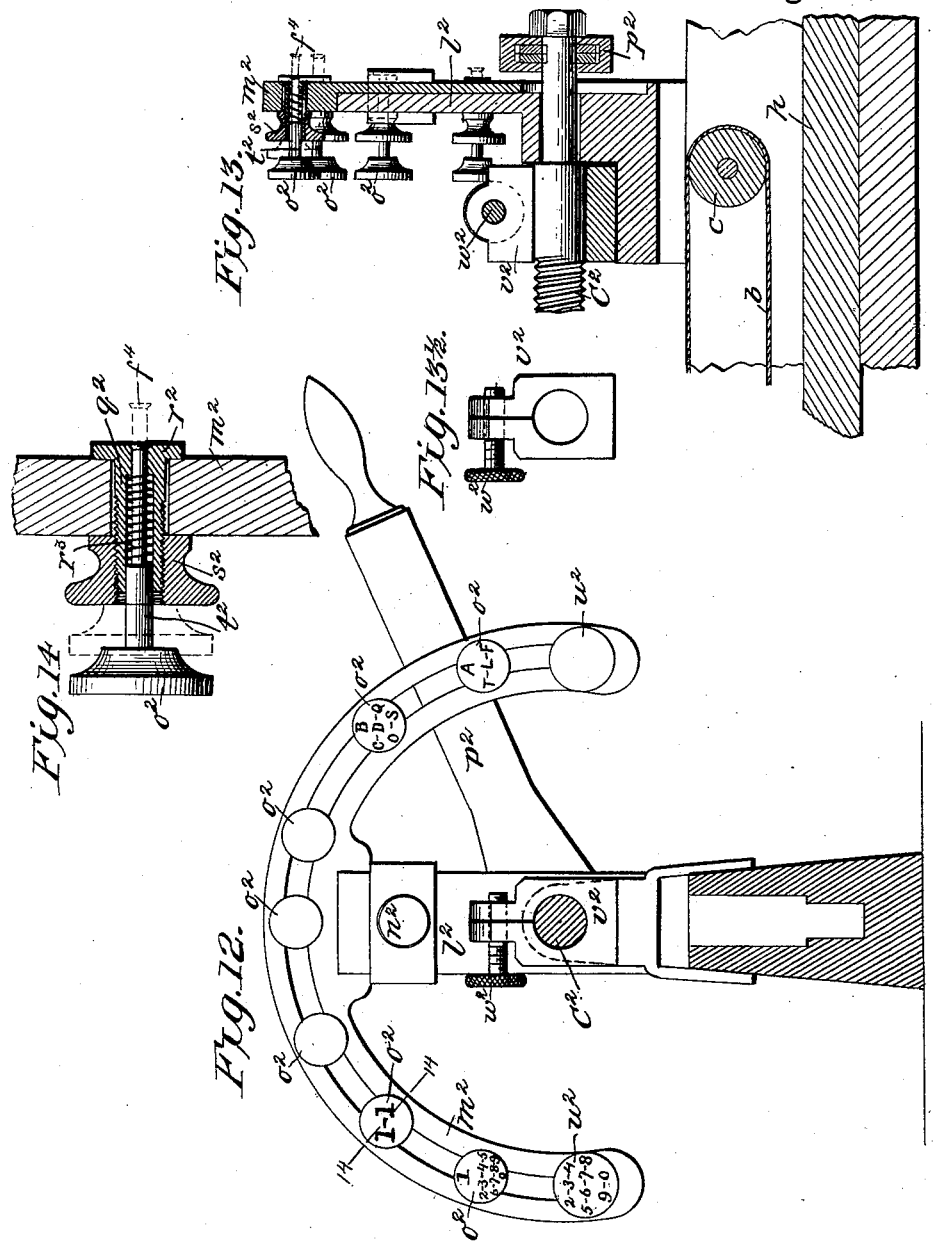
WITNESSES:
F. L. Ourand.
Marcus S. Hopkins.
INVENTORS.
Vincent L. Ourdan
Charles A. Kolb
BY
Hopkins & Atkins
ATTORNEYS (No Model.) 9 Sheets—Sheet 7.

V. L. OURDAN & C. A. KOLB.
ENGRAVING APPARATUS.

No. 435,243. Patented Aug. 26, 1890.

WITNESSES:
F. L. Ourand
Marcus S. Hopkins

INVENTORS
Vincent L. Ourdan
Charles A. Kolb.
BY
Hopkins & Atkins
ATTORNEYS.

(No Model.) 9 Sheets—Sheet 8.
V. L. OURDAN & C. A. KOLB.
ENGRAVING APPARATUS.
No. 435,243. Patented Aug. 26, 1890.
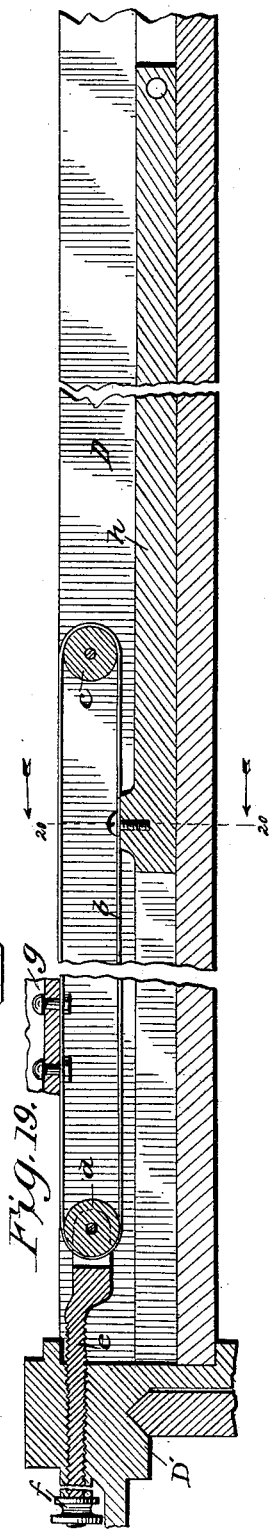
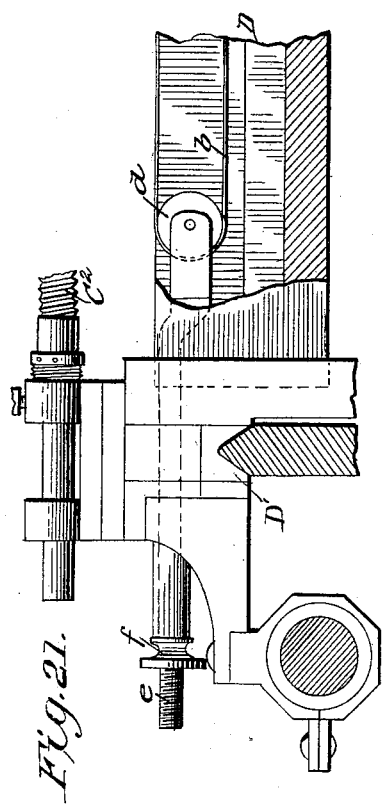
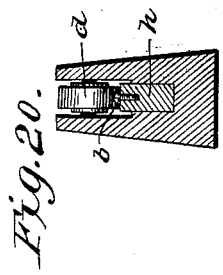
WITNESSES:
F. L. Ourand
Marcus T. Hopkins
INVENTORS.
Vincent L. Ourdan
Charles A. Kolb.
BY
Hopkins & Atkins
ATTORNEYS.

(No Model.) 9 Sheets—Sheet 9.
V. L. OURDAN & C. A. KOLB.
ENGRAVING APPARATUS.
No. 435,243. Patented Aug. 26, 1890.
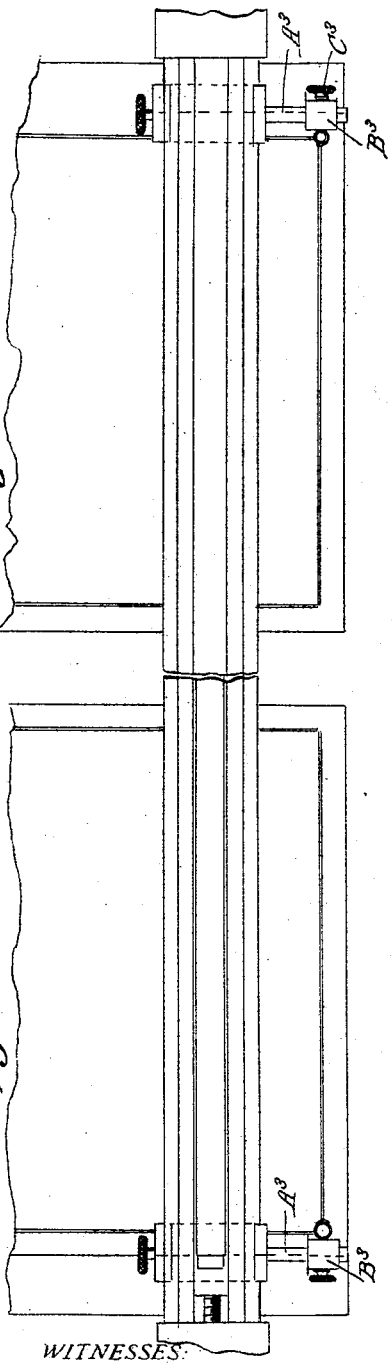
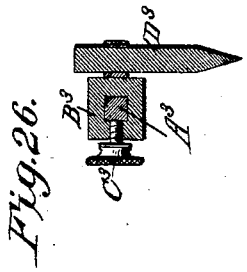
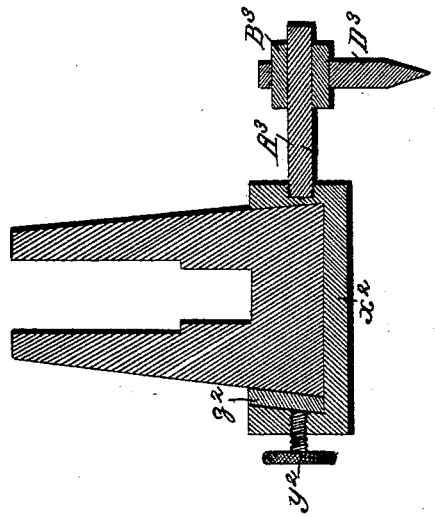
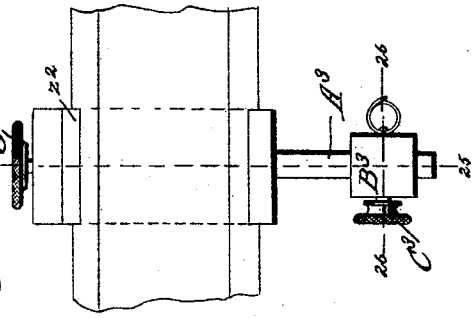
WITNESSES:
Marcus S. Hopkins
C. P. Elwell.
INVENTORS
Vincent L. Ourdan
Charles A. Kolb.
BY
Hopkins & Atkins
ATTORNEYS.
THE NORRIS PETERS CO., PHOTO-LITHO., WASHINGTON, D. C.

UNITED STATES PATENT OFFICE.

VINCENT L. OURDAN AND CHARLES A KOLB, OF WASHINGTON, DISTRICT OF COLUMBIA, ASSIGNORS TO THE OURDAN & KOLB ENGRAVING MACHINE, ENGRAVING AND MERCANTILE COMPANY, OF VIRGINIA.

ENGRAVING APPARATUS.

SPECIFICATION forming part of Letters Patent No. 435,243, dated August 26, 1890.

Application filed March 26, 1890. Serial No. 345,408. (No model.)

*To all whom it may concern:*

Be it known that we, VINCENT L. OURDAN and CHARLES A. KOLB, of Washington, in the District of Columbia, have invented a certain new and useful Engraving Apparatus, of which the following is a specification, reference being had to the accompanying drawings.

The object of our invention is to produce an engraving-machine applicable to fine work, where great accuracy is essential, and it is especially designed for map and chart work, where the relations of the parts represented are required to be exact.

Another object is to reduce the cost of fine engraving work by the use of our invention, which dispenses with the numerous verifications and corrections ordinarily necessary even with the most skilled workmen in map and chart making.

Our apparatus is in the nature of an improvement upon that of our Patent No. 374,492.

Figure 2:
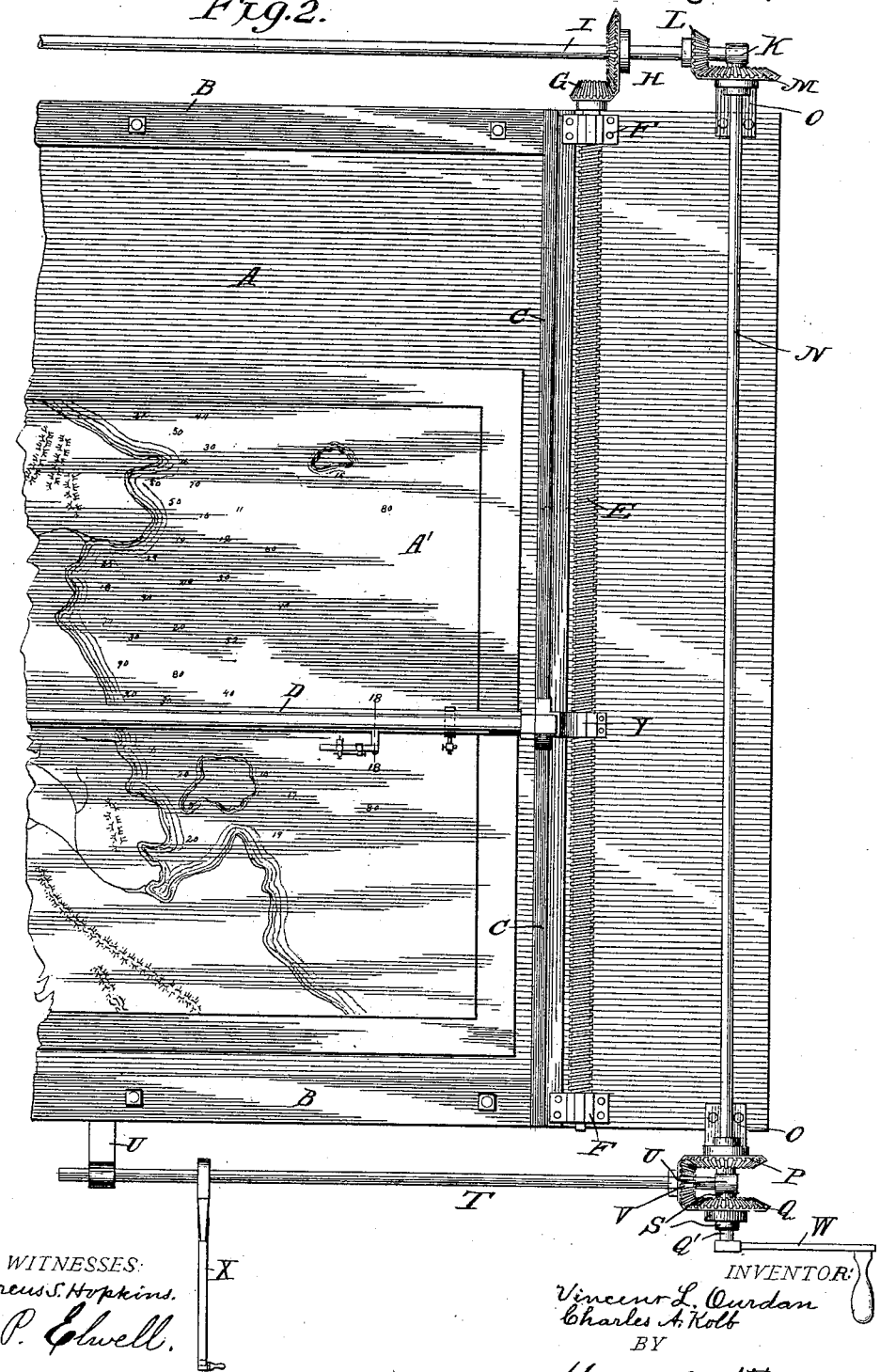
Figure 3:
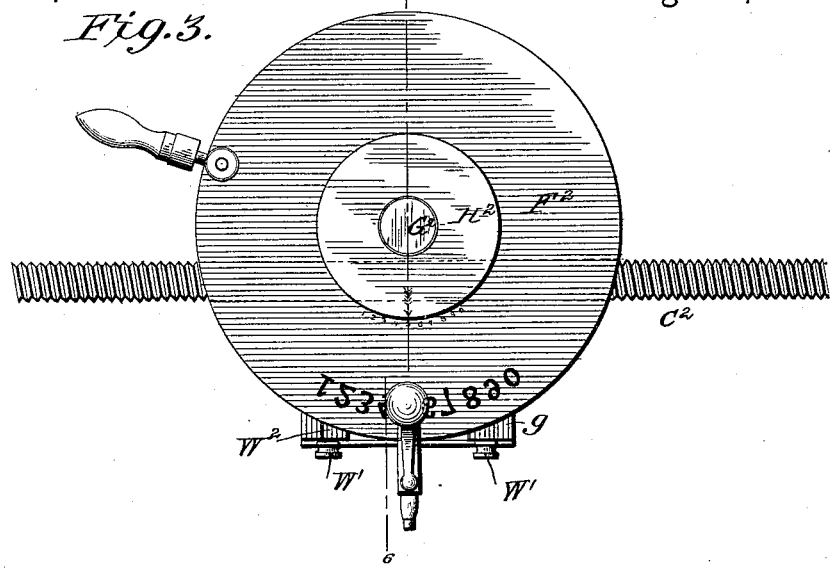
Figure 4:
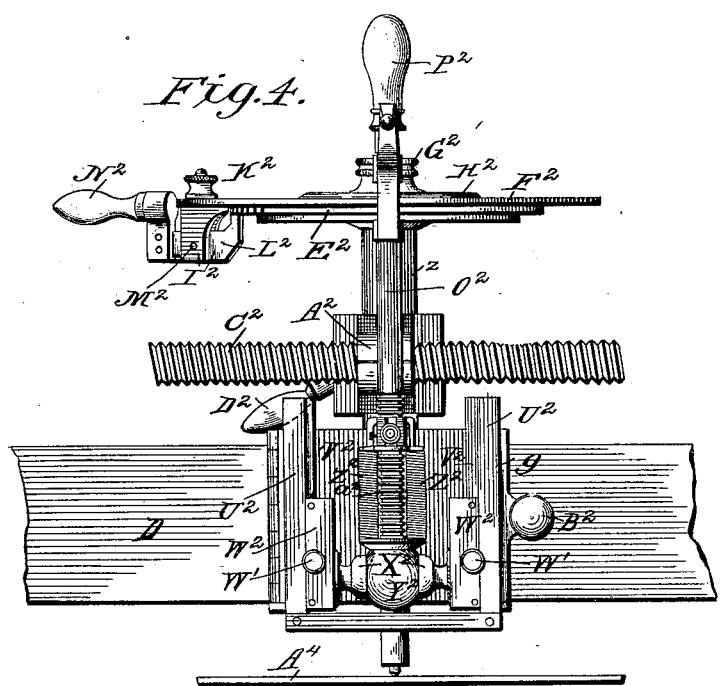
Figure 15:
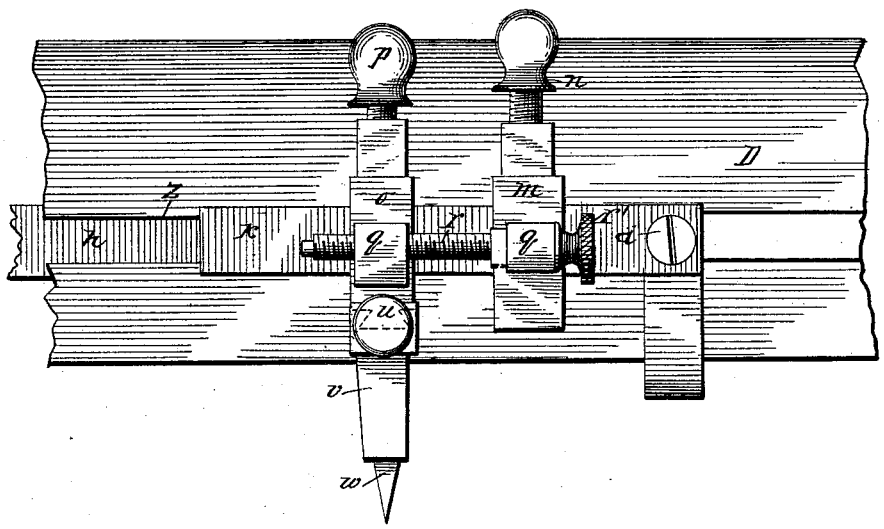
Figure 16:
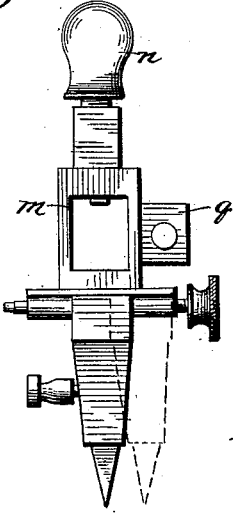
Figure 17:
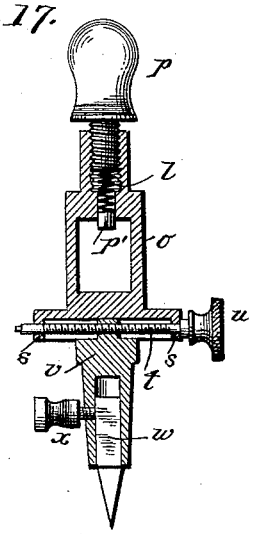
Figure 18:
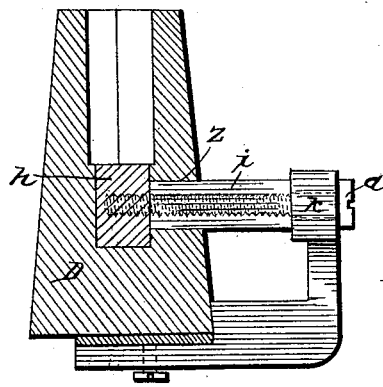

Referring to the accompanying drawings, illustrating our invention, Figure 1 is a plan view showing the left-hand side, and Fig. 2 a plan view showing the right-hand side, of our complete apparatus. Fig. 3 is a plan view of the pattern-plate in position over the carriage. Fig. 4 is a front elevation of the pattern-plate, carriage, and engraving mechanism. Fig. 5 is a front elevation similar to that shown in Fig. 4, except that the hinged part of the carriage is swung open. Fig. 6 is a central vertical section taken on the line 6 6 of Fig. 3. Fig. 7 is a view, partly in section, of the engraving-tool, shaft, and connected parts detached. Fig. 7½ is a view showing a part of the shaft O² and the ratchet-lever down. Fig. 8 is a side elevation of the handle part of the shaft detached. Fig. 9 is a vertical sectional view of the same. Fig. 10 is a plan view of a notched disk for supporting the pattern-plate detached. Fig. 11 is a similar view of another disk, being differently notched. Fig. 12 is a side elevation of a spacing attachment, showing the bridge in section. Fig. 13 is a vertical section through the spacing attachment and its supporting parts. Fig. 13½ is an end view of an endless-screw bearing. Fig. 14 is a central sectional view through one of the stops, taken on line 14 14 of Fig. 12. Fig. 15 is a front elevation of a compensating attachment for locating points. Fig. 16 is a detail of part of the same. Fig. 17 is a vertical central section of the parts shown in Fig. 16. Fig. 18 is a section on the line 18 18 of Fig. 2, illustrating the manner of attaching the compensating device to the rod *h*, which is shown in section. Fig. 19 is a longitudinal section of the track, showing the endless band and connected parts. Fig. 20 is a section on the line 20 20 of Fig. 19. Fig. 21 is a front elevation, partly in section, of the left-hand end support of the track and connected parts, taken on line 21 of Fig. 1. Fig. 22 is a plan view of one end of the bridge, showing in blank a section of a chart or map to serve as a guide, and showing an adjusting-gage projecting from one side of the bridge. Fig. 23 is a plan view of the other end of the bridge, showing a section of a metal plate in blank to be engraved, and also showing a similar gage. Fig. 24 is a plan view of an adjustable gage applied to the under side of the bridge. Fig. 25 is a section of the same on the line 25 25 of Fig. 24, and Fig. 26 is a section on the line 26 26 of Fig. 24.

Referring to the letters upon the drawings, A, Figs. 1 and 2, indicates a table-top of suitable dimensions and suitably supported in position for receiving a map, chart, or other guide A' to be followed in engraving a metal plate A⁴.

B indicates two frame-pieces for supporting the tracks C, upon which the bridge D slides back and forth on suitable runners at its ends. The track at the left (see Figs. 19 and 21) is shaped on its surface like an inverted V, and the track-runner D' at that end of the bridge is similarly shaped on its bearing-surface, so as to saddle onto the track, which then forms a guide to direct the movements of the bridge in a right line.

E indicates endless screws mounted in bearings F, supported on the frame-pieces. These screws are provided at their rear ends with beveled gears G, connecting with bevel-gears H upon a shaft I at the rear, supported in suitable bearings K.

L is another bevel-gear upon one end of the shaft I, gearing with another bevel-gear M on a shaft N at the right, (see Fig. 2,) supported in suitable bearings O.

P is a bevel-gear upon the front end of the shaft N.

Q is another bevel-gear on a short shaft Q' in line with shaft N, supported in suitable bearings S.

T is a front shaft mounted in suitable bearings U and provided with a bevel-gear V between and meshing with the bevel-gears P and Q.

W is a crank upon shaft Q', and X is a ratchet-lever of well-known pattern applied to the shaft T.

Nuts Y upon the screws E are secured to the bridge-runners in any suitable manner, so that as the screws are turned in different directions the bridge will be caused to travel on its tracks to and fro. The nuts Y are split and provided with clamping-screws in the usual way to compensate for wear.

When it is desired to move the bridge rapidly or a long distance in either direction, the crank W is employed to rotate the screws rapidly by means of the gearing just described; but when only slight movement of the bridge is required the ratchet-lever is used to rotate the shaft T.

The bridge carries the engraving mechanism and guide or station indicating or compensating mechanism and mechanism for adjusting these two devices, the engraving mechanism always being adjusted to correspond relatively with the position of the indicating mechanism. The bridge is slotted vertically and longitudinally to receive an endless band $b$, running over a fixed pulley $c$ mounted in the slot of the bridge, and an adjustable pulley $d$ mounted on a screw-threaded rod $e$, provided with a nut $f$ and projecting through the end support of the bridge, so that by turning the nut the tension of the endless band may be adjusted. To the upper part of this endless band is secured the carrier $g$ of the engraving mechanism. To the lower part of the band is secured a rod $h$, adapted to slide in the longitudinal vertical slot of the bridge, and which carries the indicating mechanism. By this arrangement, whenever the indicating mechanism is moved in one direction the engraving mechanism will be moved in the opposite direction exactly the same distance.

The bridge is provided with another longitudinal slot Z through one side, and the bracket $i$ for supporting the indicating mechanism extends through this slot and is secured to the rod $h$ in any usual way, as by a screw $a$. The details of this indicating mechanism are best shown in Figs. 16, 17, and 18, where $k$ indicates a bar integral with or secured to the bracket $i$ in any suitable manner. This bar supports a block $m$, provided with a set-screw $n$, so that it may be adjusted lengthwise of the bar to any desired position and then secured in place by the set-screw.

The bar also carries another block $o$, provided with a set-screw $p$, which bears upon a coiled spring $l$, that in turn bears upon a small vertically-sliding block $p'$, resting at its lower end upon the bar. The set-screw regulates the tension of the spring, and so the pressure of the block $p'$ upon the bar. These blocks are each provided with a lug $q$, the one on the block $o$ being female screw-threaded to receive an endless screw $r$. When the block $m$ is fixed in place, the block $o$ can be moved to and fro on the bar by simply unfastening its set-screw and operating the endless screw $r$ by means of its thumb-piece $r'$. The block $o$ is cut away on its under side, leaving lugs $s$, which form bearings for an endless screw $t$, provided with a thumb-piece $u$ for operating it. Supported on this endless screw is a female screw-threaded holder $v$, projecting downward and supporting the pointer $w$. This pointer is made adjustable up and down within the hollow part of the holder, and can be secured at any desired elevation by means of a set-screw $x$. By the mechanism described the pointer can not only be raised or lowered at will, but it can be moved on a line parallel with the bridge by sliding the block $o$ upon the bar or in a direction at right angles to the bridge by means of the endless screw $t$. Besides this, it of course partakes of all the movements of the bridge and of the rod $h$. When it is desired to move the station-indicating mechanism over long distances, it is accomplished by moving the endless band and the rod $h$ or the bridge, or both. The nicer adjustments are to be employed, for example, to compensate for any variation in the guide or chart. Sometimes contraction or expansion takes place, under different atmospheric conditions, in paper charts serving as guides for engraving-plates, and hence after making each figure it is necessary to make some slight adjustment of the pointer before setting the apparatus and proceeding to engrave another figure.

Referring now to the engraving mechanism, the carrier $g$ is composed of two parts hinged together, one part being secured to the endless band and supporting the standard $z$ and the other part supporting the engraving-tool and the mechanism connected with it. (See Figs. 4, 5, and 6.) The object of having the carrier in two parts hinged together is that the operator may swing open one part carrying the engraving mechanism, thus removing it out of the way, so that he can view his work on the plate without moving the bridge.

$B^2$ indicates a hand-screw for securing the hinged part to the fixed part, and for conveniently releasing it when it is desired to swing it open. The standard $z$ supports a two-part nut $A^2$, which engages with an endless screw $C^2$, resting at each end in suitable bearings. (See Fig. 1.) The two parts of this nut are adapted to slide away from each other, so as to free the nut from engagement with the screw, and then to come together again so as to clamp the screw. A pivoted cam-lever $D^2$ is employed to operate the parts of the nut in the usual way; but we claim no novelty either in the nut or its operating mechanism, and therefore have not illustrated them in detail, as they are well known. The standard also carries a disk $E^2$, notched on its periphery to serve as a guide for the adjustment of the pattern-plate $F^2$, which is supported on the disk. This pattern-plate is held in position by means of a washer $G^2$ and a thumb-nut $H^2$. It carries underneath its margin a block $I^2$, secured in place by means of a thumb-nut $K^2$, so that it may be detached. This block is slotted on its under side to receive a latch $L^2$, pivoted at $M^2$, and provided with a handle $N^2$ for operating it. The inner end of this latch is adapted to engage with the notches on the margin of the disk $E^2$ and to be released from them at will, and the notches serve as guides for rotating and setting the pattern-plate. There may be a variety of such disks differently notched, so as to give, by applying one or another, a great many different adjustments of the pattern-plate. The pattern-plate has cut on its face, near the margin, Fig. 3, in reverse the figures or forms to be cut in the metal plate beneath, and of course different pattern-plates are to be employed to correspond with the different figures or designs to be engraved. Corresponding small index-figures are cut near the inner margin of the plate on the same radial lines to aid in the rotary adjustment of the plate in connection with the arrow.

$O^2$ indicates the pivoted shaft of the engraving-tool, provided with a removable hollow handle $P^2$ for guiding the point $Q^2$ upon the pattern-plate and effecting the movements necessary to engrave the desired figure by means of the engraving point or cutter $R^2$ in the lower end of the shaft, which bears at its upper end against a screw $R^3$ to compensate for wear of the cutter, the screw being screwed down as the cutter wears off.

$P'$ indicates a stud projecting from the side of the upward extension of the shaft adapted to enter the L-shaped slot $Q^4$ of the hollow handle and form a bayonet-joint, so that the handle can be removed. When the stud $P'$ enters the horizontal part of the slot, it will prevent the handle from slipping off and the point $Q^2$ from rising off from the pattern-plate. The cutting-point $R^2$ will then be held out of contact with the plate $A^4$. When the stud $P'$ is in the vertical part of the slot, then the engraving-point $R^2$ will be down upon the plate. The point $Q^2$ slips freely up and down in the hollow part of the upper extension of the engraving-shaft, but is secured by means of a screw rigidly in the upper part of the hollow handle $P^2$, and always moves up and down with the handle. By this construction and the employment of the springs $Z^2$ and the slotted block $h^2$ and ratchet-lever $b^2$ and rack $a^2$ on the engraving-shaft we provide for holding the point $Q^2$ in place on the figures in the engraving-plate, notwithstanding the engraving shaft and cutter $R^2$ may move up and down owing to inequalities on the surface of a plate being engraved. This is a very important feature of our invention, because it enables the tool $R^2$ to cut uniformly over all inequalities on the surface of an engraving-plate, and still the point $Q^2$ always remains in the same horizontal plane unaffected by the vertical movements of the cutter $R^2$ and engraving-shaft.

$S^2$ is a lifting hand-piece attached to the U-shaped part $T^2$ of the shaft, by means of which the engraving-tool may be raised when desired out of contact with the metal plate beneath and the point $Q^2$ out of contact with the pattern-plate.

$U^2$ represents frame-pieces forming parts of the hinged part of the carrier and having guideways $V^2$ on their inner sides forming vertical bearings for the slide-blocks $W^2$, which are provided with set-screws $W'$ to secure them in place after adjustment. Secured to these blocks are the ball-bearings $X^2$, carrying the ball $Y^2$, through which the shaft loosely passes.

$Z^2$ indicates coiled springs on either side of the shaft, secured at their lower ends to the ball and at their upper ends to a block $h^2$, through which the shaft passes. The annular rack $a^2$ is formed on the shaft, and the pivoted ratchet-lever $b^2$ is applied in a slot in one side of the block $h^2$, so as to engage by its teeth $i^2$ with the rack and raise the block, stretch the springs, and adjust the spring-tension as desired.

$c^2$ indicates a push-rod within the handle of the ratchet-lever, provided with a spring $d^2$, tending to press the rod outward. To the inner end of the push-rod is pivoted a pawl $e^2$, which in turn is pivoted to the handle of the ratchet-lever at $f^2$ and adapted to engage with the teeth $g^2$ on the block $h^2$. By pressing on the outer end of the push-rod the pawl will be disengaged, so that the ratchet-lever may be lowered and then stopped in any desired position. The spring $d^2$ tends to keep the pawl $e^2$ in engagement with the teeth $g^2$ of the block. When the ratchet-lever is down, as shown in Fig. $7\frac{1}{2}$, the plain part $k^2$ of the inner end of the lever will be opposite the rack, so that the teeth $i^2$ and the block $h^2$ will be disengaged from the rack, and then the shaft can be withdrawn.

$l^2$ indicates a standard, which supports a curved segment $m^2$, adapted to be adjusted up and down upon the standard by means of set-screw $n^2$. (See Figs. 6 and 12.) This segment is provided with a number of stops $o^2$, which project through the curved slot in the segment and are adjustable to different positions. These stops are intended to limit the movement of a ratchet-lever $p^2$, which is applied to one end of the endless screw $C^2$ to rotate it for the purpose of changing the position of the engraving-tool and the indicating mechanism when their positions are required to be only slightly altered in a line parallel with the bridge. By adjusting the stops in different positions the oscillating movements of the ratchet-lever $p^2$ are limited and the turn of the endless screw $C^2$ is regulated. By adjusting the segment up or down on its standard we provide another means for regulating the oscillating movement of the ratchet-lever without changing the adjustment of the stops. Thus by the two means just described we can adjust the oscillating movements of the ratchet-lever with great nicety to control the turning of the endless screw $C^2$, and consequently the relative movements of the engraving and indicating mechanism.

In Fig. 14 the details of the adjustable stops are shown. $q^2$ indicates a hollow screw provided with a head $r^2$ and adapted to extend through the curved slot in the segment $m^2$. $s^2$ is a nut fitting on the opposite end of the screw, by means of which the stop is clamped to the segment in any desired position. $t^3$ is a movable stop-rod extending through the hollow screw $q^2$ and provided with a coiled spring $r^3$, tending to keep the stop-rod in the position shown in the full lines, Fig. 14. It can be pushed forward to the position shown in the dotted lines in that figure, and then it acts as a stop for the ratchet-lever $p^2$. $f^4$ is a head on the end of the stop-rod to prevent the spring $r^3$ from throwing it out of the screw $q^2$. $u^2$ indicates two fixed stops, which may be projections of any form from the front side of the segment $m^2$.

In practice the movable stops are set in such positions as to permit appropriate oscillating movements of the ratchet-lever for turning an endless screw to make the different spacings between letters or figures to be engraved. Thus, for example, the movement of the oscillating lever from one fixed stop to the first movable stop would cause the movements of the engraving mechanism and the station-indicating mechanism far enough to leave a certain small space on the engraving-plate after one figure had been engraved before another should be engraved. Again, a movement of the oscillating lever from the same fixed stop to the second movable stop would result in such movements by the turning of the endless screw as to leave a greater space between two figures to be engraved, and so on. Each movable stop permits an oscillation of the ratchet-lever for turning the endless screw over a greater distance than the preceding stop. These stops are suitably marked on their heads in practice so as to indicate the spacings that their use, respectively, will effect when they are properly adjusted. The result is that the workman has only to push on the head of a given stop, marked to show him what will be the result, so as to project its opposite end against the tension of its spring into the path of oscillation of the ratchet-lever and then use the ratchet-lever to turn the endless screw. By this means he will always effect the spacing desired with speed and exactness, the stops having been all adjusted properly in the beginning.

$v^2$ is a split bearing for the endless screw $C^2$, provided with clamping-screw $w^2$ to clamp it around the journal of the screw, so as to prevent the screw from turning backward after it has been turned in one direction by the use of the ratchet-lever $p^2$.

In order to gage the plate exactly and quickly with the chart serving as a guide for engraving the plate, we provide points (see Figs. 1, 2, 22, 23, 24, 25, and 26) supported by suitable mechanism connected to the lower part of each end of the bridge.

$x^2$, Fig. 25, indicates a holder straddling the lower side of the bridge, and secured thereto by a set-screw $y^2$ and gib or bearing-plate $z^2$. Secured to this holder in any suitable way and projecting forward of the bridge is an arm $A^3$, carrying a hollow sliding block $B^3$, and a set-screw $C^3$, adapted to hold the block in any position to which it may be adjusted on the arm.

$D^3$ is a pointer movable up and down in its place, being held merely by friction. Any other form of parts to serve the purpose might be employed. By aid of these pointers the charts and plates may be quickly and reliably placed in proper position, and the pointers will indicate whether they remain so during the work of engraving the plate.

By means of the improved mechanism described all of the exact adjustments and safeguards required to make a true plate for printing a map or marine chart, or such parts of it as this apparatus is adapted to make, can be quickly and reliably secured, so that the work can be done rapidly and with great economy without the aid of an expert engraver. Furthermore, all the mechanism is simple, durable, and not likely to get out of order.

What we claim is—

1. In an engraving apparatus, the combination, with a frame, of two endless screws mounted on either side and geared together at the rear by a shaft I, an end shaft N, geared with the shaft I, a short shaft Q′, geared with the shaft N and provided with a crank, a shaft T, geared with the shafts N and Q′ and provided with a ratchet-lever, and a bridge connected at its ends by means of nuts Y with the endless screws, and tracks for supporting the bridge-runners, one of them serving as a guide, whereby the bridge may be moved back and forth in a right line at different speeds, substantially as set forth.

2. In an engraving apparatus, the combination, with the longitudinally and vertically slotted bridge, of an endless band mounted in the slot, the carrier for the engraving mechanism secured to the upper part of the band, and a slide-rod within the bridge-slot secured to the lower part of the band, substantially as set forth.

3. In an engraving apparatus, the combination, with the longitudinally and vertically slotted bridge, of an endless band mounted in the slot, the carrier for the engraving mechanism secured to the upper part of the band, a slide-rod within the bridge-slot secured to the lower part of the band, and a screw upon which one of the band-pulleys is mounted provided with a thumb-nut, whereby the tension of the band can be regulated, substantially as set forth.

4. In an engraving apparatus, the combination, with the slotted bridge carrying in its slot the endless band on which the carrier is mounted and the slide-rod carrying the station-indicating mechanism, of an endless screw $C^2$, engaging a nut on the carrier, and mechanism for turning the endless screw, substantially as set forth.

5. In an engraving apparatus, the combination, with a frame, of two endless screws supported on the frame, a bridge connected by nuts at its ends with the endless screws and supported upon tracks parallel with the screws, one of which tracks serves as a guide for the movements of the bridge, and engraving apparatus and station-indicating apparatus carried by the bridge, substantially as set forth.

6. In an engraving apparatus, the combination, with a frame, of two endless screws supported by the frame, a bridge connected by nuts at its ends with the endless screws and provided with tracks parallel with the screws, a gage projecting from one side of the bridge at each end of it, and a station-indicating mechanism and an engraving mechanism carried by the bridge, substantially as set forth.

7. In an engraving apparatus, the combination, with a frame, of tracks thereon, a bridge supported by the tracks, an engraving and station-indicating mechanism supported by the bridge and connected by gearing, so as to be moved simultaneously in opposite directions on the bridge, and mechanism for moving the bridge forward and back, substantially as set forth.

8. In an engraving apparatus, the combination, with a bridge movable back and forth, of engraving mechanism and station-indicating mechanism upon the bridge and adapted to move with the bridge, and gearing supported by the bridge and adapted to move the station-indicating mechanism and the engraving mechanism to and fro upon the bridge simultaneously in opposite directions, substantially as set forth.

9. In an engraving apparatus, the combination, with the bridge, of the carrier composed of two parts, one supporting the standard and pattern-plate and connected mechanism and the other supporting the pivoted engraving-shaft and its connected mechanism, substantially as set forth.

10. The combination, with the engraving-shaft and its ball-and-socket-joint mechanism, of the springs $Z^2$, the block $h^2$, slotted and toothed, as shown, and a ratchet-lever pivoted to the block and operating upon a rack on the shaft, substantially as set forth.

11. The combination, with the engraving-shaft provided with the engraving-point $R^2$ at its lower end, and the guide-point $Q^2$, of the pattern-plate, the notched disk under the pattern-plate, and the latch or stop mechanism secured to the pattern-plate and adapted to engage with the notches in the disk to determine the rotary movement of the pattern-plate, substantially as set forth.

12. In an engraving apparatus, the combination, with the bridge and the engraving and station-indicating mechanism, of the endless screw $C^2$, the standard $l^2$, vertically-adjustable segment $m^2$, provided with stops $u^2$ and $o^2$, and oscillating ratchet-lever $p^2$, substantially as set forth.

13. In an engraving apparatus, the combination, for moving the engraving mechanism, of an endless screw connected therewith, a ratchet-lever for rotating the screw, and adjustable stops to limit the oscillating movements of the lever, substantially as set forth.

14. In combination with the segment $m^2$, the fixed stops $u^2$ and the adjustable stops $o^2$, substantially as set forth.

15. The combination, with the bridge and slide-rod $h$, of the bracket $i$, secured to the slide-rod, the bar $k$, projecting parallel with the bridge and carrying the blocks $m$ and $o$, and the endless screw $r$, substantially as set forth.

16. The combination, with the bar $k$, of the blocks $m$ and $o$, the endless screw $r$ and the endless screw $t$, carried by the block $o$, and the adjustable holder $v$, adapted to be moved by the endless screw so as to control the point $w$, substantially as set forth.

17. In an engraving apparatus, the combination, with a frame, of tracks thereon, a bridge supported at its ends by the tracks, and engraving and station-indicating mechanism supported by the bridge and connected by gearing so as to be moved simultaneously in opposite directions on the bridge, substantially as set forth.

18. In an engraving apparatus, the combination, with the engraving-shaft made hollow at its upper end, of a hollow handle carrying the point $Q^2$ and fitting over the hollow part of the engraving-shaft, an L-shaped slot in the hollow handle, and a stud projecting from the hollow part of the shaft and adapted to enter the slot of the hollow handle, substantially as set forth.

19. In an engraving apparatus, the combination, with the engraving-shaft and the pattern-plate, of the hollow slotted handle, and the hollow upward extension of the shaft having a stud to fit the slot in the handle, the springs $Z^2$, the slotted and toothed block $I^2$, and the ratchet-lever pivoted to the block, substantially as set forth.

20. In an engraving apparatus, the combination, with the engraving-shaft hollow at its upper end and carrying a point vertically movable within the hollow of the shaft, of springs $Z^2$, the slotted and toothed block $h^2$, and the ratchet-lever pivoted to the block, substantially as set forth.

21. In an engraving apparatus, the combination, with an engraving-shaft carrying a point $Q^2$ above a pattern-plate and a cutter $R^2$ to bear upon an engraving-plate, of the U-shaped bend in the shaft, whereby the point $Q^2$ can be worked on the surface of the pattern-plate, substantially as set forth.

In testimony of all which we have hereunto subscribed our names.

VINCENT L. OURDAN.
    CHARLES A. KOLB.

Witnesses:
 JOSEPH L. ATKINS,
 MARCUS S. HOPKINS.